(12) United States Patent
Cerrano

(10) Patent No.: US 10,525,294 B2
(45) Date of Patent: *Jan. 7, 2020

(54) FIRE-FIGHTING CONTROL SYSTEM

(71) Applicant: Hale Products, Inc., Ocala, FL (US)

(72) Inventor: Jason Cerrano, Wentzville, MO (US)

(73) Assignee: Hale Products, Inc., Ocala, FL (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/899,183

(22) Filed: Feb. 19, 2018

(65) Prior Publication Data

US 2018/0185682 A1    Jul. 5, 2018

Related U.S. Application Data

(63) Continuation of application No. 15/417,568, filed on Jan. 27, 2017, now Pat. No. 9,919,170, which is a continuation of application No. 14/947,316, filed on Nov. 20, 2015, now Pat. No. 9,564,028, which is a continuation of application No. 13/800,320, filed on
(Continued)

(51) Int. Cl.
| | |
|---|---|
| *G05D 11/00* | (2006.01) |
| *A62C 31/02* | (2006.01) |
| *A62C 37/00* | (2006.01) |
| *A62C 37/38* | (2006.01) |
| *A62C 2/00* | (2006.01) |

(Continued)

(52) U.S. Cl.
CPC ................ *A62C 31/02* (2013.01); *A62C 2/00* (2013.01); *A62C 37/00* (2013.01); *A62C 37/38* (2013.01); *G05B 19/058* (2013.01); *G08B 5/38* (2013.01); *G05B 2219/41302* (2013.01)

(58) Field of Classification Search
CPC ............ A62C 37/00; A62C 37/02; A62C 2/00; A62C 37/38; G05B 19/058; G05B 5/38; G05B 2219/41302
USPC ........................................................ 700/282
See application file for complete search history.

(56) References Cited

U.S. PATENT DOCUMENTS

| | | |
|---|---|---|
| 2,711,929 A | 6/1955 | Nielsen |
| 3,762,478 A | 10/1973 | Cummins |

(Continued)

OTHER PUBLICATIONS

International Search Report and Written Opinion for International Application No. PCT/US2011/050838; dated Feb. 21, 2012; 14 pages.

*Primary Examiner* — Davis D Hwu
(74) *Attorney, Agent, or Firm* — Armstrong Teasdale LLP

(57) ABSTRACT

A control system for use with a fire-fighting device includes a remote component having a touch sensitive screen configured to receive a user-requested parameter of fluid and to display a plurality of indicators associated with the fire-fighting device. The control system also includes a base component including a programmable logic controller having predefined logic stored thereon. The base component automatically controls operation of the pump based on the predefined logic and the user-requested parameter of fluid. The remote component receives signals from the base component and presents, via the touch sensitive screen, at least one of a first of the plurality of indicators indicative of a water volume associated with a first water source stored at a fire fighting device, and a second of the plurality of indicators indicative of a water pressure associated with a second water source remote from the fire-fighting device.

16 Claims, 6 Drawing Sheets

Related U.S. Application Data

Mar. 13, 2013, now Pat. No. 9,220,935, which is a continuation of application No. 12/879,503, filed on Sep. 10, 2010, now Pat. No. 8,418,773.

(51) Int. Cl.
*G08B 5/38* (2006.01)
*G05B 19/05* (2006.01)

(56) References Cited

U.S. PATENT DOCUMENTS

| | | | |
|---|---|---|---|
| 4,189,005 A | 2/1980 | McLoughlin | |
| 4,561,459 A | 12/1985 | Jackman | |
| 4,949,794 A | 8/1990 | Petit et al. | |
| 5,044,445 A | 9/1991 | Kayahara | |
| 5,249,632 A | 10/1993 | Sparling et al. | |
| 5,846,085 A | 12/1998 | Witt, III | |
| 5,860,479 A | 1/1999 | LaFollette | |
| 5,975,162 A | 11/1999 | Link, Jr. | |
| 6,547,528 B1 | 4/2003 | Yoshida | |
| 6,651,900 B1 | 11/2003 | Yoshida | |
| 6,685,104 B1 | 2/2004 | Float et al. | |
| 6,816,072 B2 | 11/2004 | Zoratti | |
| 6,993,421 B2 | 1/2006 | Pillar et al. | |
| 7,184,866 B2 | 2/2007 | Squires et al. | |
| 7,243,864 B2 | 7/2007 | Trapp et al. | |
| 7,264,062 B1 | 9/2007 | Ham | |
| 7,503,338 B2 | 3/2009 | Harrington et al. | |
| 7,739,921 B1 | 6/2010 | Babcock | |
| 7,897,916 B2 | 3/2011 | Sudakov et al. | |
| 7,980,317 B1 | 7/2011 | Preta et al. | |
| 7,987,916 B2 | 8/2011 | Laskaris et al. | |
| 8,418,773 B2 | 4/2013 | Cerrano | |
| 9,919,170 B2 * | 3/2018 | Cerrano | A62C 37/00 |
| 2003/0158640 A1 | 8/2003 | Pillar et al. | |
| 2004/0024502 A1 | 2/2004 | Squires et al. | |
| 2006/0131038 A1 | 6/2006 | Lichtig | |
| 2006/0180321 A1 | 8/2006 | Yoshida | |
| 2007/0164127 A1 | 7/2007 | Lozier et al. | |
| 2008/0041599 A1 | 2/2008 | Mulkey et al. | |
| 2008/0215700 A1 | 9/2008 | Pillar et al. | |
| 2009/0120653 A1 | 5/2009 | Thomas | |
| 2010/0052310 A1 | 3/2010 | Stoops | |
| 2010/0274397 A1 | 10/2010 | Lozier et al. | |
| 2010/0319479 A1 | 12/2010 | Sjolin et al. | |
| 2011/0017477 A1 | 1/2011 | Combs | |
| 2011/0064591 A1 | 3/2011 | McLoughlin et al. | |
| 2011/0174383 A1 | 7/2011 | Combs | |
| 2011/0187524 A1 | 8/2011 | Cochran, III | |
| 2011/0200461 A1 | 8/2011 | Christensen et al. | |

* cited by examiner

FIRE-FIGHTING CONTROL SYSTEM

CROSS REFERENCE TO RELATED APPLICATIONS

This application is a continuation of U.S. patent application Ser. No. 15/417,568, filed Jan. 27, 2017, which is a continuation of U.S. patent application Ser. No. 14/947,316, filed Nov. 20, 2015, now U.S. Pat. No. 9,564,028, which is a continuation of U.S. patent application Ser. No. 13/800,320, filed Mar. 13, 2013, now U.S. Pat. No. 9,220,935, which is a continuation of U.S. patent application Ser. No. 12/879,503, filed Sep. 10, 2010, now U.S. Pat. No. 8,418,773, the disclosures of which are incorporated herein by reference in their entirety.

BACKGROUND OF THE INVENTION

The present invention relates generally to control systems and, more specifically, to control systems for use in controlling a fire-fighting device.

Fire-fighting pumper trucks (broadly referred to herein as a "fire-fighting device") are used to fight fires by pumping liquid (e.g., water, foam, or another flame retardant) from a source through hose lines wherein the liquid may be directed; i.e., sprayed, on a fire to facilitate the extinguishing or containing the fire. Known pumper trucks include controls to regulate the operation of the truck and to control the flow of liquid from the truck into the hose lines. Such controls generally include a plurality of valves used to control the flow of liquid to a fire pump from a storage tank transported onboard the truck or from another liquid supply source (e.g., a fire hydrant). Such valves also enable control of the flow of liquid from the fire pump to fire hoses or other discharge devices. Known controls include pressure and flow rate gauges used to monitor the pressure and flow rate of liquid at various locations within the pumper truck. For example, pressure gauges may monitor the pressure of the liquid received by the fire pump from the supply source. Generally the pumper truck controls used to regulate the valves and the fire pump, as well as the pressure and flow rate gauges, are commonly positioned in a control panel on the side of the pumper truck.

In known pumper trucks, during use, an operator, typically referred to as an engineer, must manually operate the controls of the pumper truck. More specifically, the engineer manually manipulates the controls to alter the flow rate and/or to control the pressure of liquid output by the pumper truck to a hose. Moreover, during operation, a firefighter positioned near a nozzle of the hose coupled to the pumper truck verbally communicates to the engineer (typically via a hand-held radio) any desired changes in the flow rate and/or pressure of liquid delivered through the hose to the nozzle. In response, the engineer manually adjusts the controls to enable the desired change in the flow rate and/or pressure of liquid delivered through the hose to be achieved. It is common for one engineer to be responsible for monitoring and responding to communications from multiple firefighters that each have a separate hose coupled to the same pumper truck. Moreover, the same engineer may also be responsible for acting as a spotter and/or controlling the operations of a mechanized fire ladder.

Accordingly, known control systems rely on the engineer to translate and execute orders communicated by a firefighter, and in response, to manipulate the controls of the pumper truck. The reliance on the engineer increases both the cost of operations and introduces the possibility of human error, as the engineer must listen to and understand verbal commands that may be difficult to understand and/or interpret depending on the location of the firefighter, the location of the fire, and/or other factors including environmental factors. Moreover, known systems cannot be used to simulate the operation of the controls of the pumper truck or to the fighting of a fire to aid in training of fire-fighting personnel.

BRIEF DESCRIPTION OF THE INVENTION

In one aspect, a control system for use with a fire-fighting device connected to a pump is provided. The system includes a user interface configured to receive a user-requested parameter of fluid, and a base component in communication with the user interface. The base component includes a programmable logic controller having predefined logic stored thereon. The base component automatically controls operation of the pump based on the predefined logic, the user-requested parameter of fluid, and at least two of: a first actuation state of a first valve configured to control a first flow of liquid from a storage tank at the fire-fighting device, a second actuation state of a second valve configured to control a second flow of liquid from a remote water source, a third actuation state of a third valve configured to control a third flow of liquid to a nozzle, a volume of water stored at the storage tank, and a water pressure associated with the remote water source.

In another aspect, a control system for use with a fire-fighting device is provided. The system includes a pump connected to the fire-fighting device, a storage tank connected to the fire-fighting device for storing a volume of water, a first valve controlling a first flow of liquid from the storage tank, a second valve controlling a second flow of liquid from a remote water source, a third valve controlling a third flow of liquid to a nozzle associated with the fire-fighting device, a base component connected to the fire-fighting device, and a user interface in communication with the base component. The base component includes a programmable logic controller having predefined logic stored thereon. The user interface is configured to receive a user-requested parameter of fluid. The base component automatically controls operation of the pump based on the predefined logic, the user-requested parameter of fluid, and at least two of: a first actuation state of the first valve, a second actuation state of the second valve, a third actuation state of the third valve, a volume of water stored at the storage tank, and a water pressure associated with the remote water source.

In another aspect, a method of controlling a fire-fighting device connected to a pump is provided. The method includes receiving, at the fire-fighting device, instructions input by a user from a user interface in communication with the fire-fighting device. The received instructions include at least one of a desired pressure of water to be output from a discharge end of a hose and a desired flow rate of water output from the discharge end of the hose. The method further includes determining, with a programmable logic controller, based on predefined logic whether to execute the instructions received from the user interface, and controlling operation of the fire-fighting device with the programmable logic controller based on the determination of whether to execute the instructions received from the user interface, and at least two of: a first actuation state of a first valve configured to control a first flow of liquid from a storage tank at the fire-fighting device, a second actuation state of a second valve configured to control a second flow of liquid from a remote water source, and a third actuation state of a third valve configured to control a third flow of liquid to the discharge end of the hose.

DETAILED DESCRIPTION OF THE INVENTION

The exemplary systems and method described herein overcome disadvantages of known fire-fighting control systems by enabling remote control of a fire-fighting device by a firefighter that is positioned a distance away from the fire-fighting device. As such, when using the systems and method described herein, a second firefighter/control operator does not need to be positioned near the fire-fighting device to manually control the fire-fighting device. Moreover, the embodiments described herein enable a user to be effectively trained on operation of the fire-fighting device in a simulation environment. As used herein, the terms user, control operator and firefighter, are used interchangeably.

Figure 1:
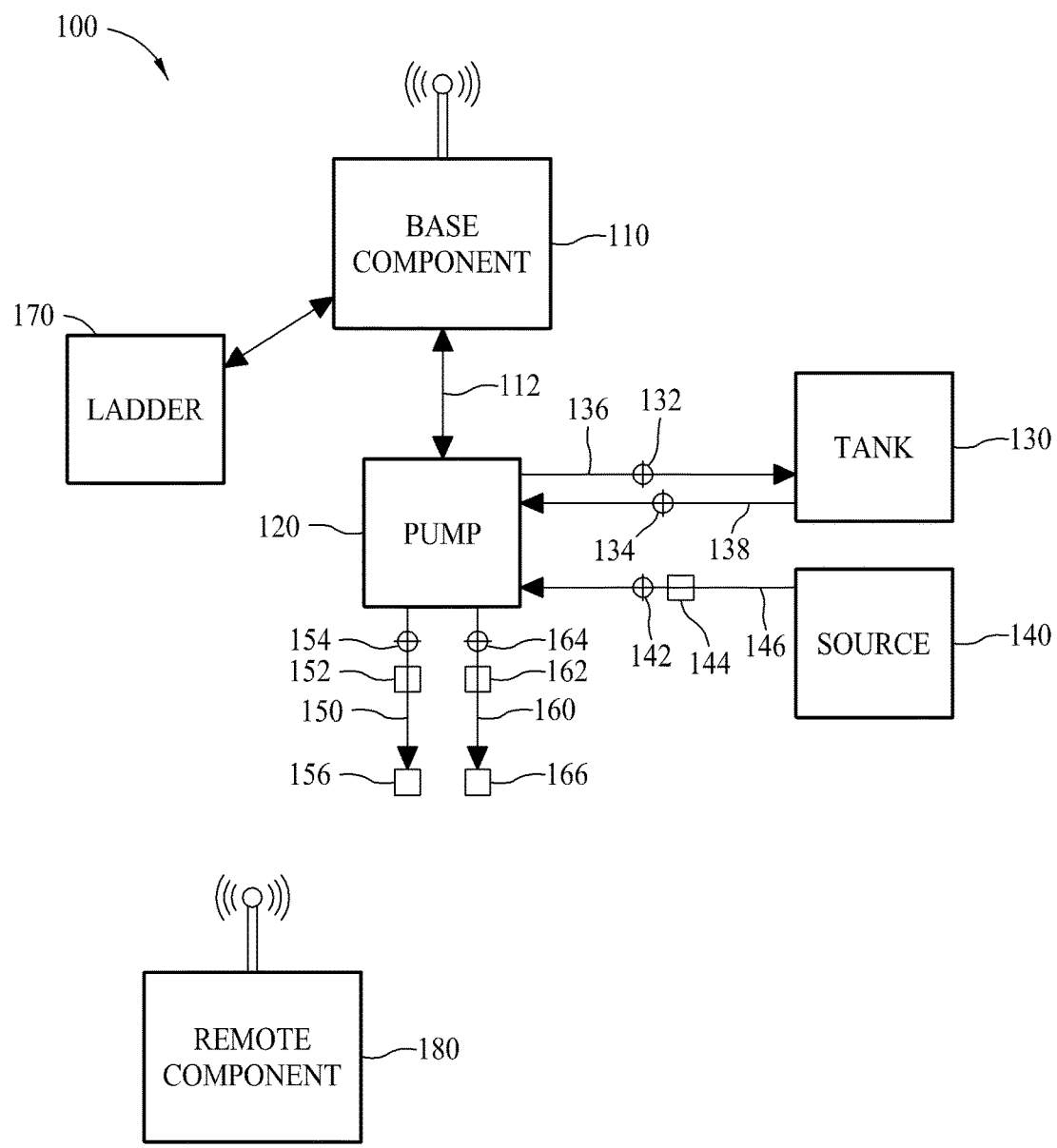
FIG. 1 is a schematic view of an exemplary fire-fighting system.

FIG. 1 is a schematic view of an exemplary fire-fighting control system 100. In the exemplary embodiment, control system 100 includes a base component 110 that is coupled by a communication link 112 to a pump 120. A tank 130 and a liquid source 140 are also coupled to pump 120. A remote component 180 is wirelessly coupled to base component 110, and a ladder 170 is also coupled to base component 110. In other embodiments, remote component 180 is wirelessly or otherwise coupled to other components (e.g., light towers, generators, scene lights, winches, cable reels, rescue tools, and/or any other electrically, hydraulically, or pneumatically controlled piece of equipment used in fire-fighting or rescue operations) in the fire-fighting device to control their operation as well.

More specifically, in the exemplary embodiment, ladder 170 is a turntable ladder that is pneumatically or hydraulically powered and is capable of being selectively telescoped between a retracted position and a fully extended position. Moreover, in the exemplary embodiment, ladder 170 is coupled to a turntable and is thus pivotable. In the exemplary embodiment, base component 110, ladder 170, tank 130, and pump 120 are coupled to a fire-fighting device (not shown), such as a fire truck, used in system 100. In other embodiments, any of base component 110, ladder 170, tank 130, and/or pump 120 may not be coupled to the fire-fighting device.

A liquid used to fight or suppress a fire is stored in tank 130. In the exemplary embodiment, the liquid is water. In other embodiments, any other liquid such as a foam-like substance or other flame retardant may be contained in tank 130. Tank 130 is coupled via a tank supply line 138 to pump 120 to enable liquid to be selectively supplied to pump 120. A tank supply valve 134 coupled to tank supply line 138 provides control of a flow of liquid from tank 130 to pump 120. A tank recirculation line 136 enables liquid to be re-circulated from pump 120 to tank 130.

A liquid source 140 is coupled to pump 120 via a source line 146. A control valve 142 coupled to source line 146 enables the flow of liquid from liquid source 140 to pump 120 to be selectively controlled. A pressure gauge 144 coupled to source line 146 is used to measure an operating pressure of liquid in source line 146. In the exemplary embodiment, the liquid discharged from liquid source 140 is water. In other embodiments, the liquid discharged from source 140 may be any other liquid such as, but not limited to, a foam-like substance or other flame retardant liquid. In the exemplary embodiment, liquid source 140 is a fire hydrant, although in other embodiments liquid source 140 may be any source of liquid, such as a river, lake, or other body of water. In the exemplary embodiment, pump 120 is operable to selectively fill tank 130 with liquid from liquid source 140.

A first nozzle 156 is coupled to pump 120 via a first hose line 150. A first hose valve 154 coupled to line 150 is used to selectively control a flow of liquid from pump 120 to first nozzle 156, and a first pressure gauge 152 coupled to line 150 is used to measure an operating pressure of liquid in first hose line 150. A second nozzle 166 is coupled to pump 120 via a second hose line 160. A second hose valve 154 coupled to line 160 is used to control a flow of liquid from pump 120 to second nozzle 166, and a second pressure gauge 162 is coupled to line 160 to measure the operating pressure of liquid in second hose line 160. In the exemplary embodiment, only two hose lines 150 and 160 are illustrated, but it should be noted that in other embodiments, more or less than two hose lines and accompanying valves, nozzles, and pressure gauges may be used. First nozzle 156 and/or second nozzle 166 may be carried or selectively positioned by firefighters.

In one embodiment, at least one of nozzle 156 and/or nozzle 166 is positioned adjacent to an end of ladder 170. More specifically, in such an embodiment, first nozzle 156 and/or second nozzle 166 is coupled to a mounting structure (not shown) that is selectively moveable by actuators to enable first nozzle 156 and/or second nozzle 166 to be aimed towards a target (e.g., a fire or a structure). Moreover, a camera (not shown) may be coupled to the end of ladder 170 and/or in the alternative, to the mounting structure. Such a camera may be wirelessly coupled to base component 110 and/or to remote component 180 such that images captured by the camera may be wirelessly communicated to base component 110 and/or remote component 180 for viewing by a user remote from the camera.

Figure 2:
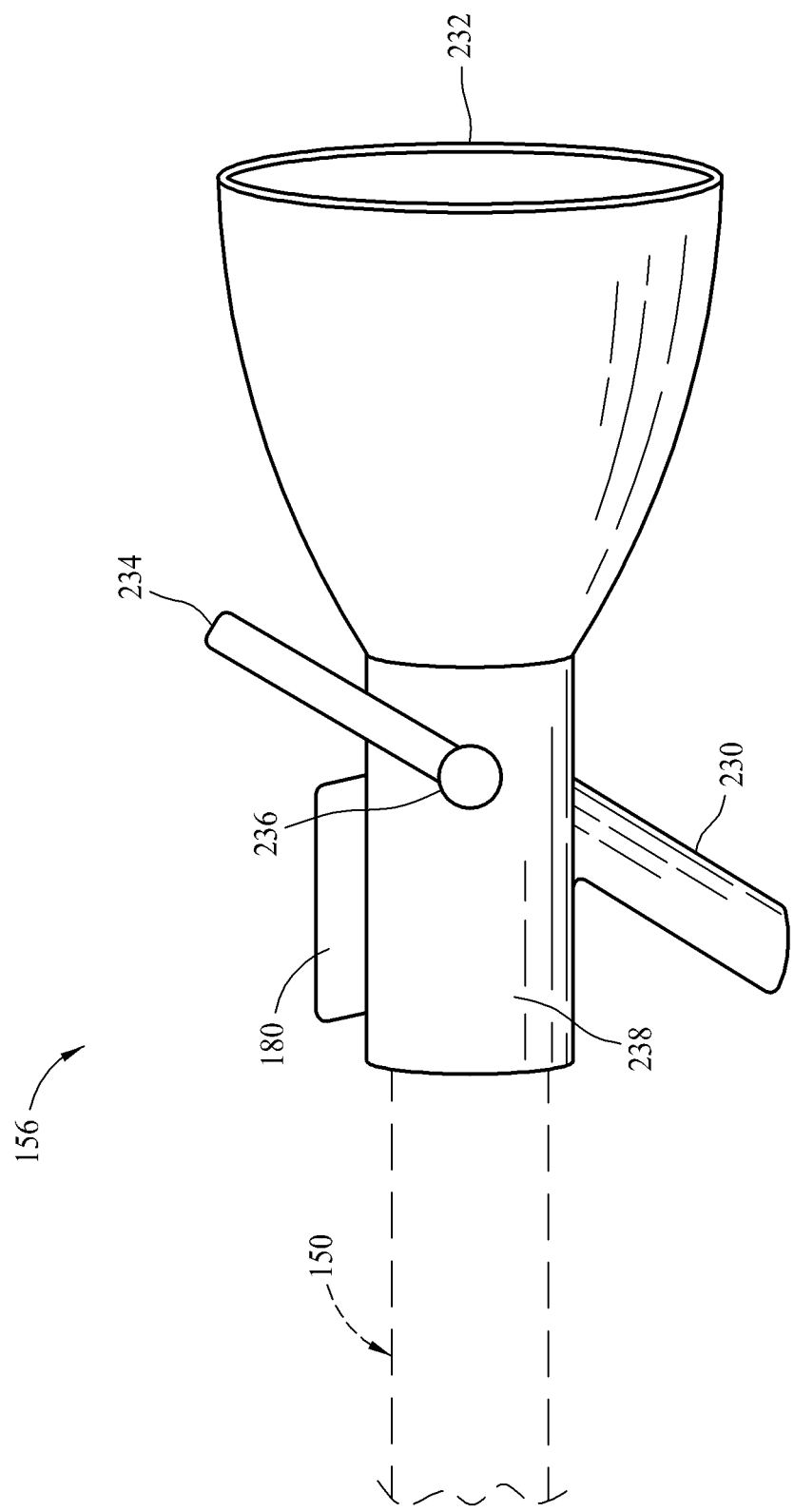
FIG. 2 is a side view of an exemplary nozzle.
Figure 3:
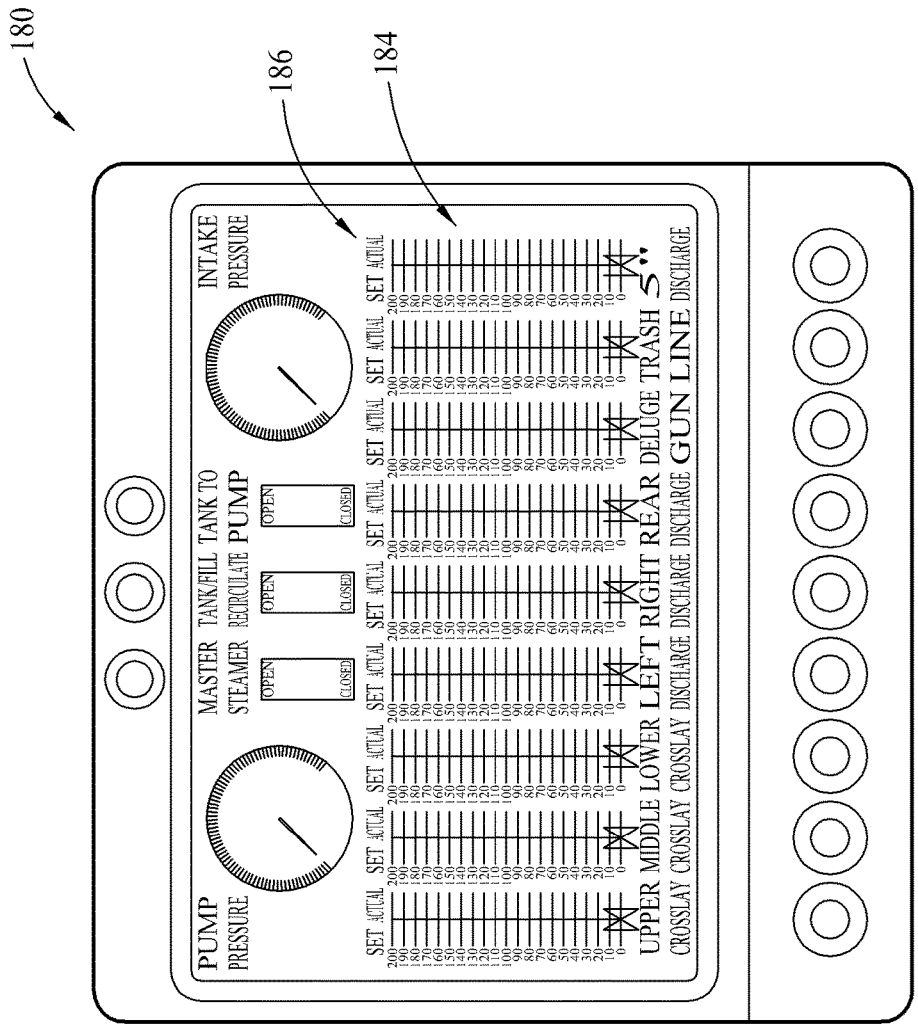
FIG. 3 is a top plan view of an exemplary remote component that may be used with the fire-fighting system shown in FIG. 1.

FIG. 2 is a side view of an exemplary nozzle and FIG. 3 is a top plan view of an exemplary remote component. More specifically, in FIG. 2 first nozzle 156 and first hose line 150 are illustrated in phantom. In the exemplary embodiment, first nozzle 156 and second nozzle 166 are identical. In other embodiments nozzle 156 is different than nozzle 166. In the exemplary embodiment, nozzle 156 includes a nozzle handle 230 that is coupled to a nozzle body 238. A bail 234 is coupled to nozzle body 238 to control the position of a valve (not shown) in nozzle body 238 that regulates the flow of liquid from a nozzle outlet 232. A bail position sensor 236 communicates the position of bail 234 to remote component 180. In the exemplary embodiment, remote component 180 is positioned atop nozzle body 238 and first nozzle 156 is formed from a heat-resistant material or materials such as anodized aluminum or any other type of aluminum with a nylon valve body. A rechargeable battery (not shown)

coupled with nozzle body 238 is electrically coupled to remote component 180. In other embodiments, a rechargeable battery may be positioned external to nozzle body 238, such as within remote component 180. In the exemplary embodiment, the rechargeable battery is recharged when either remote component 180 or nozzle body 238 is placed in a charging cradle (not shown). Alternatively, the rechargeable battery may be removed from nozzle body 238 and inserted in the charging cradle to be recharged.

In the exemplary embodiment, remote component 180, includes various selectors and/or controls 186 that may be manipulated to facilitate control and operation of system 100. While only one remote component 180 is illustrated, it should be understood that system 100 includes multiple separate remote components 180 for use in controlling operation of each nozzle. The layout of controls 186 (broadly, an "input device) included in remote component 180 as illustrated in FIG. 3, for example, is exemplary only, and system 100 may include any number of controls 186 that are positioned in any orientation that enables system 100 to function as described herein. For example, in the exemplary embodiment, at least some controls 186 are included in remote component 180 to facilitate control of the operating pressure in first hose line 150, second hose line 160, and/or any other hose lines included in system 100. Moreover, in the exemplary embodiment, controls 186 are also included in remote component 180 to facilitate control of 132, 134, 144, 154 and/or 164. Controls 186 also control operation of pump 120. In the exemplary embodiment any and/or all of controls 186 may be selectively controllable by a firefighter via remote component 180. Moreover, remote component 180 also communicates the position of bail 234 to other components of system 100.

Figure 4:
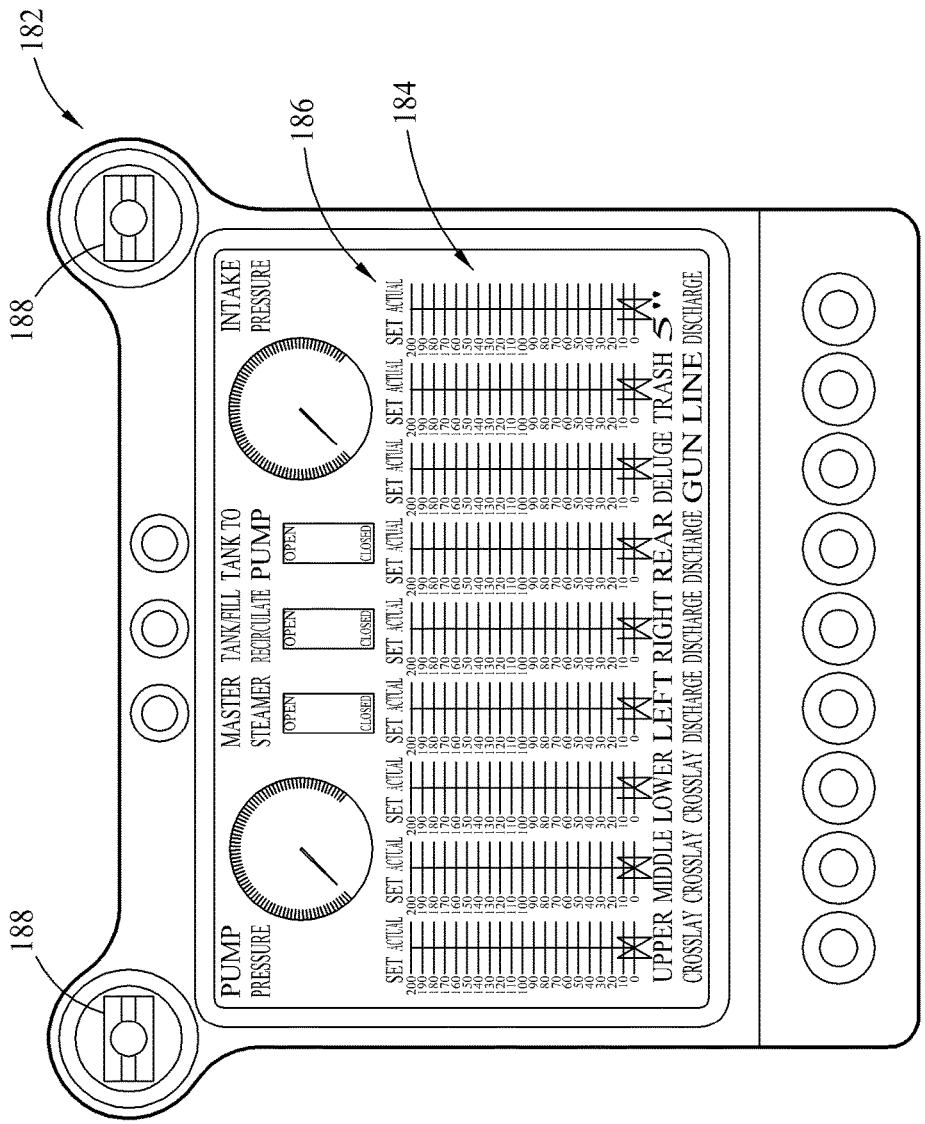
FIG. 4 is a top plan view of an alternative embodiment of an exemplary remote component.

FIG. 4 shows an alternative remote component 182 that may be used with system 100. In the exemplary embodiment, remote component 182 is substantially similar to remote component 180. Accordingly, in the exemplary embodiment, remote control 182 includes same controls 186 as remote component 180, and also includes ladder controls 188 for use in controlling ladder 170. More specifically, in the exemplary embodiment, ladder controls 188 include at least one joystick. In other embodiments, ladder controls 188 may include any other control device that enables remote component 180 to function as described herein. Alternatively, remote component 182 may replace remote component 180 without departing from the scope of the embodiments.

Remote components 180, 182 also include various indicators 184 (broadly, "output devices") that are positioned adjacent to each control 186. Indicators 186 provide a visual indication of the actual pressure in first hose line 150, second hose line 160, and/or other hose lines (not shown) in system 100. Indicators 184 are also included in remote component 180 to provide a visual indicator of the actuation states of valves 132, 134, 144, 154, and/or 164 in system 100. Moreover, in some embodiments, remote component 180 may also include audio and/or graphical displays that are triggered based on response to signals received from base component 110. For example, remote component 180 may include indicators 184 that display warning messages communicated from base component 110. Remote component 180 may also include an input device (not shown) for use in communicating other information to base component 110. In other embodiments, remote component 180 may also include indicators 184 that display a colored light (e.g., a green light) when system 100 is ready to provide liquid to fire nozzle 156 and/or second nozzle 166 and another colored light (e.g., a red light) when system 100 is in a predetermined operational status or when specific controls 186 are not ready for actuation on remote component 180. Remote components 180, 182 may also include other indicators such as, but not limited to, an LED water level indicator, warning indicator(s), and/or an audible output device or strobe light for aid in locating remote component 180 in limited/low visibility conditions. Moreover, the audible output device or strobe light on remote component 180 may be activated by another user at base component 110.

In the exemplary embodiment, remote component 180 includes a touch sensitive screen that overlays a graphical display. Accordingly, in such an embodiment, controls 186 are manipulated by a user by pressing on the predetermined locations on the screen. In the exemplary embodiment, indicators 184 and controls 186 on remote component 180 are easily reconfigured. For example, remote component 180 may be capable of displaying different sets of controls 186 and indicators 184.

Remote component 180 is integrally formed with first nozzle 156 in the exemplary embodiment. Alternatively, remote component 180 may be coupled to first nozzle 156. Moreover, an additional remote component similar to or the same as remote component 180, or 182 may be portable and worn or carried by a firefighter (not shown) positioned adjacent to second nozzle 166 or first nozzle 156. For example, such a remote component may be portable and may be carried by the firefighter on a lanyard or via a handle extruding from remote component 180.

Remote component 182 is portable and may be carried by a firefighter positioned in a basket (not shown) at the end of ladder 170 thus enabling the firefighter to use ladder controls 188 to control the position of ladder 170. In another embodiment, remote component 182 may be carried by an operator (i.e., an engineer) that is not in the basket and that is acting as a spotter for those in ladder 170. More specifically, when first nozzle 156 and/or second nozzle 166 are positioned adjacent to the end of ladder 170, remote component 182 may be carried by a firefighter positioned on the ground, and not in the basket at the end of ladder 170. In such an embodiment, the firefighter is able to control operation of nozzles 156 and/or nozzle 166 and/or ladder 170 while that firefighter remains positioned on the ground or at a location other than on the ladder 170. Moreover, in such an embodiment, images captured by the camera positioned near the end of ladder 170, and position details of first nozzle 156 and/or second nozzle 166 are wirelessly communicated to remote component 182. In the exemplary embodiment, images may be displayed on remote component 182 by a firefighter using remote component 182 while using remote component 182 to control the operation of ladder 170, first nozzle 156 and/or second nozzle 166.

Remote component 180 is configured to communicate wirelessly with base component 110 and to transmit data to base component 110. Base component 110 is similarly configured to communicate wirelessly with remote component 180 and to transmit data to remote component 180. In the exemplary embodiment, remote component 180 includes a wireless transceiver that enables data to be transmitted and received to/from base component 110 in the form of radio frequency transmissions. In other embodiments, remote component 180 and base component 110 include any other suitable component that is operable to link remote component 180 and base component 110 together such that data can be transmitted between remote component 180 and base component 110.

When communicating with base component 110, remote component 180 transmits a unique identifier with each wireless transmission. The identifier associates remote component 180 with first nozzle 156 and enables base component 110 to identify the communications received from remote component 180 as being associated with first nozzle 156. Similarly, any other remote component 180 associated with second nozzle 166 also transmits a unique identifier in each wireless transmission with base component 110. Prior to operation of system 100, each remote component 180 may be automatically associated with its respective nozzle as each component is inserted in a specific charging cradle. For example, a charging cradle may be provided for each nozzle 156 and/or 166 and placement of a remote component 180 in a respective charging cradle associates that remote component 180 with only one nozzle 156 and/or 166. In another embodiment, remote component 180 may be associated with a respective nozzle 156 and/or 166 by manipulating a control or switch on remote component. In an alternative embodiment, each remote component 180 may communicate with base component 110 on a different channel or frequency that is unique to only one remote component 180.

Similarly, communications sent by base component 110 to each remote component 180 also include a unique identifier that enables each remote component 180 to identify whether it is the intended recipient of the communication. In another embodiment, base component 110 does not transmit a unique identifier with each communication but rather transmits communications to each remote component 180 on a different channel or frequency that is unique to each remote component 180 being used.

Returning to FIG. 1, valves 132, 134, 142, 154, and 164 are each coupled to base component 110 such that the operation of each is controlled by base component 110. Moreover, each valve 132, 134, 142, 154, and 164 also includes at least one feedback sensor (not shown) that enables the actuation state of each of valves 132, 134, 142, 154, and/or 164 to be monitored and continuously communicated to base component 110. Pressure gauges 144, 152, and 162 are each coupled to base component 110 such that base component 110 continuously monitors the output (i.e., an operating pressure) of each pressure gauge 144, 152, and/or 164. In the exemplary embodiment, base component 110 includes a transceiver that enables data to be transmitted and received wirelessly to/from remote component 180 in the form of wireless communications (e.g., radio frequency communications). Base component 110 also wirelessly communicates the actuation state of valves 132, 134, 142, 154, and/or 164, operating pressures sensed by pressure gauges 144, 152, and/or 164, and a rotational speed of pump 120, for example, to remote component 180. Base component 110 also wirelessly communicates information associated with ladder 170 to remote component 180 and/or 182.

In the exemplary embodiment, base component 110 includes and/or is coupled to a programmable logic controller (PLC) (not shown). The PLC is operable to control operation of system 100 based on communications received from remote component 180, the actuation state of valves 132, 134, 142, 154, and/or 164, and the operating pressures sensed by pressure gauges 144, 152, and/or 164 (collectively referred to as "inputs"). Based on inputs received by base component 110, the PLC determines, based on predefined logic and/or set of rules (the two terms are referred to herein interchangeably), control operation of system 100. The set of rules broadly define the boundary conditions and/or operating limitations for system 100. For example, the predefined logic may indicate maximum pressures for hose lines 150 and/or 160, a maximum or minimum operating speed of pump 120, a maximum or minimum operating pressure in source line 146, and/or a maximum or minimum amount of liquid to be maintained in tank 130. Such rules may also define the operational responses of base component 110 for system 100, based on inputs to system 100.

In one example, when base component 110 receives a communication from a remote component 180 associated with first nozzle 156 demanding an increase in liquid pressure in first hose line 150, the PLC will control operation of system 100 based on the predefined logic. In such an example, the set of rules may require that the first valve 154 be opened until the desired operating pressure sensed by first pressure gauge 152 plus or minus a predefined tolerance (e.g., ±5 psi). If the desired pressure is not attained, system 100 causes the operating speed of pump 120 to increase until the desired operating pressure is sensed by first pressure gauge 152 plus or minus the predefined tolerance. To maintain a desired or predefined operating pressure in source line 146, the operating logic may also dictate that the operating speed of pump 120 be limited based on the operating pressure sensed by pressure gauge 144. For example, when liquid source 140 is a fire hydrant, it may be necessary to ensure that the operating pressure in pipes or water mains supplying the hydrant and thus supplying the operating pressure in source line 146, does not decrease below a predefined threshold to facilitate preventing the pipes or water mains from collapsing. Accordingly, in such an embodiment, the PLC may reduce the operating speed of pump 120. In a situation wherein system 100 is unable to provide the desired pressure in first hose line 150, as requested in a communication received from base component 180, the base component 110 transmits a communication to remote component 180 indicating as such. After receiving such a communication, remote component 180 may provide an audio, vibratory, and/or visual indication to the firefighter. For example, in one embodiment, remote component 180 vibrates nozzle handle 230 after receiving such a communication and/or illuminate a light on remote component 180 or nozzle 156.

In another example, when base component 110 receives a communication from a remote component 180 associated with first nozzle 156, water flow to first nozzle 156 is ceased. In such an embodiment, the PLC in base component 110 controls operation of system 100 based on the inputs and based on the predefined logic. The predefined logic requires first valves 154 to be closed after receiving such a communication from remote component 180 and that the operating speed of pump 120 is reduced such that the operating pressure sensed by gauge 162 remains substantially constant if liquid is being pumped through second hose line 160. If liquid is not being channeled through second hose line 160, the operating speed of pump 120 is reduced to idle, and tank recirculating valve 132 and tank supply valve 134 are opened to enable liquid to be recirculated through tank 130. The predefined logic may also require that source valve 142 be closed after a level of liquid in tank 130 has reached a predefined threshold (e.g., a predefined capacity of tank 130).

While reference is made herein to the remote control of system 100 by remote component 180, operation of system 100 by remote component 180 may be interrupted at any time by a user (e.g., an engineer) positioned near base component 110 and/or positioned remotely from component 180 at the fire-fighting device. Such user is thus able to control operation of system 100 and override wireless communications transmitted by remote component 180 to base component 110.

Figure 5:
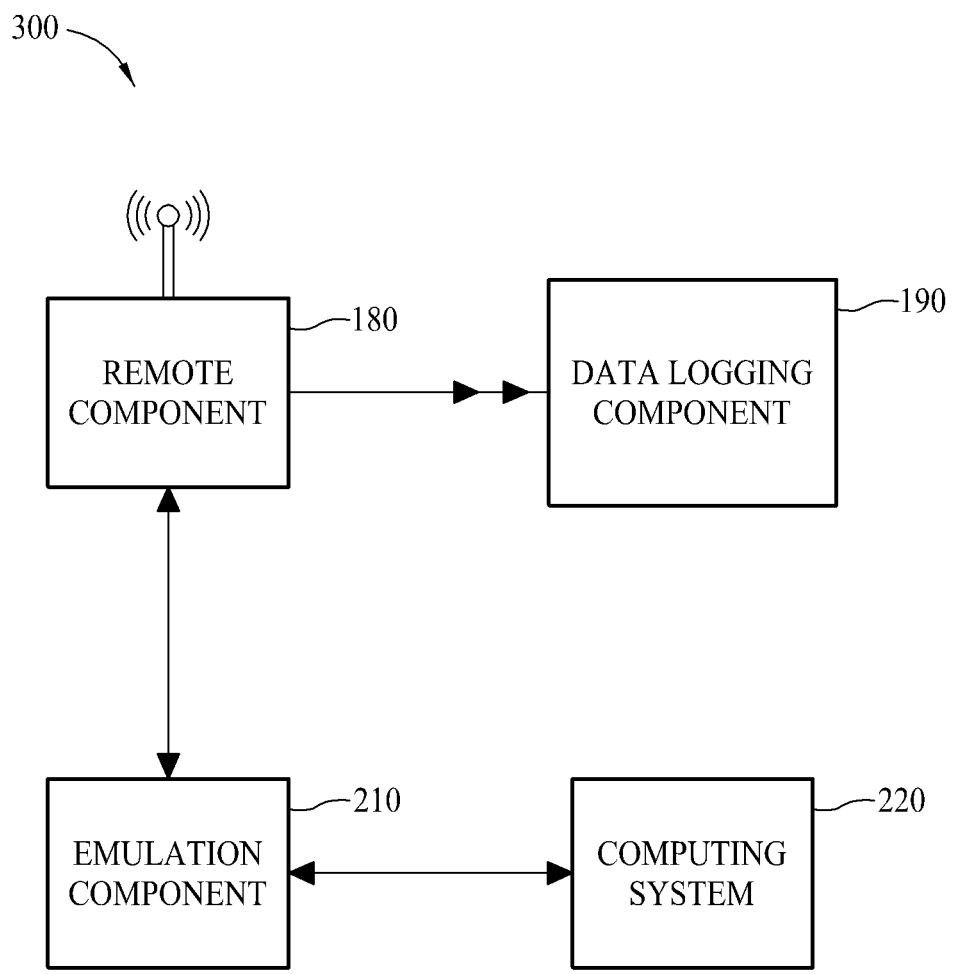
FIG. 5 is a schematic view of an exemplary fire-fighting simulation system.

FIG. 5 is a schematic view of an exemplary fire-fighting simulation system 300. In the exemplary embodiment, simulation system 300 includes remote component 180, a data logging component 190, an emulation component 210 (broadly referred to here as, an "interface component"), and a computing system 220. Remote component 180 is wirelessly coupled to data logging component 190 and emulation component 210, and emulation component 210 is wirelessly coupled to computing system 220. It should be noted that computing system 220 may be any suitable computer that includes at least a processor and at least one form of computer readable media with computer executable instructions stored thereon. In the exemplary embodiment, emulation component 210 is a software program having computer executable instructions that are stored on the computer readable media and that are executable by the processor of computing system 220. In other embodiments, emulation component 210 is a separate component that is coupled to computing system 220.

Simulation system 300 enables remote component 180 to be used in training a user (i.e., a trainee) in a simulation environment using emulation component 210 and computing system 220. Specifically, during a simulation exercise, computing system 220 displays a graphical representation to trainee depicting a fire-fighting scenario. Emulation component 210 and computing system 220 enable the graphical representation to be easily changed through manipulation of the controls of remote component 180 by the trainee. Accordingly, a trainee using system 300 is able to alter the operating pressures in hose lines, change a position of ladder 170, control operation of pump 120, and receive immediate feedback from emulation component 210 and computing system 220 regarding their inputs. For example, a trainee presented with a graphical representation of a fire by emulation component 210 and computing system 220, is able to use remote component 180 to manipulate the position valves and/or ladder 170 of system 100 within the simulation environment set forth by emulation component 210 and computing system 220. Emulation component 210 and computing system 220 then react to the inputs of the trainee and change the simulation environment based on the inputs.

In the exemplary embodiment, emulation component 210 is controllable by a trainer such that various scenarios can be selectively presented to the trainee. Accordingly, in the exemplary embodiment, using emulation component 210, the trainer is able to present various scenarios to the trainee that replicate a scenario that the trainee may encounter when fighting an actual fire. For example, the trainer may instruct the emulation component 210 to simulate the loss of pressure from liquid source 140. The trainee will then be forced to use remote component 180 to close source valve 142 and to open tank supply valve 134 to supply liquid from tank 130 to pump 120. In one embodiment, other scenarios included in emulation component 210 may be executed automatically such that the trainer is not required to control emulation component 210 in order to present the trainee with a continuous presentation of other scenarios. In another embodiment, emulation component 210 presents a graphical display on computing system 220 that resembles a typical control panel on a fire-fighting device. The trainee is thus able to use emulation component 210 to practice and train on the operation of the control panel included on the fire-fighting device.

Data logging component 190 stores data on a computer readable form of media. Such data includes data associated with the position of ladder 170 and inputs received by remote component 180 from each user. In the exemplary embodiment of FIG. 5, data logging component 190 is communicatively coupled to remote component 180. Similarly, in the exemplary embodiment illustrated in FIG. 1, data logging component 190 is coupled to base component 110 and is operable to store data associated with the position of ladder 170, the operation of pump 120, communications received from the remote component 180, the operating position of valves 132, 134, 142, 154, and/or 164, and operating pressures sensed by pressure gauges 144, 152, and/or 162. Data stored by data logging component 190 may be used to conduct "post action" studies or reports concerning operation of system 100. Moreover, data stored by data logging component 190 may also be used to develop scenarios for use in training of personnel using emulation component 210.

Figure 6:
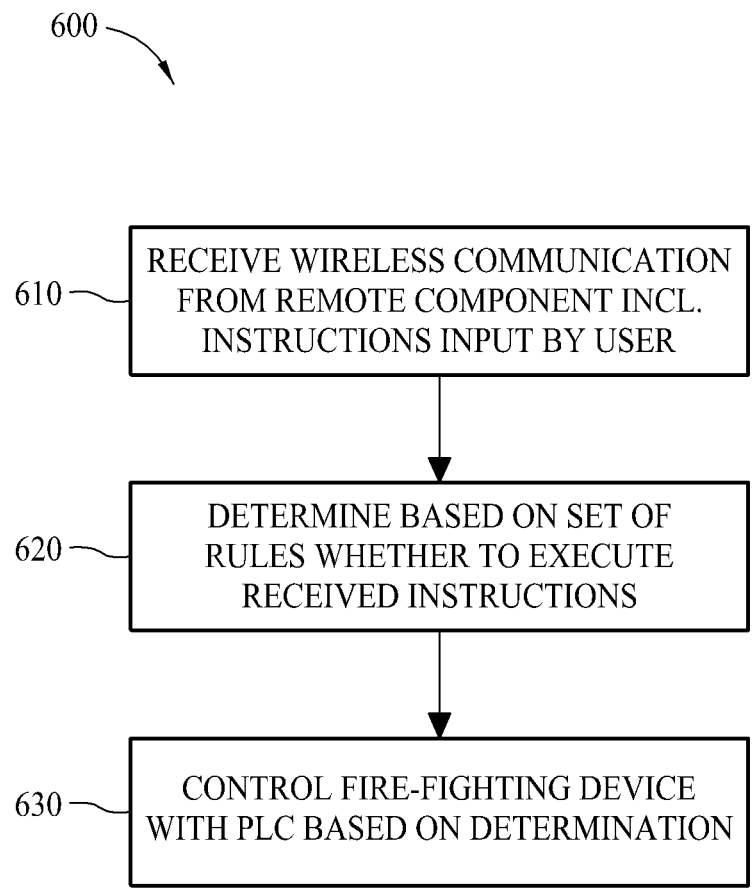
FIG. 6 is a flow diagram of an exemplary method of controlling a fire-fighting system.

FIG. 6 illustrates a flow diagram of an exemplary method 600 of controlling system 100. Method 600 begins with receiving 610 wireless communication from remote component 180 by base component 110. Such wireless communication includes instructions input by a user (e.g., a firefighter) into remote component 180. The instructions as described above, can include, but are not limited to only including, a desired operating pressure of water in first hose line 150 and/or second hose line 160, a desired actuation state of any of valves 132, 134, 142, 154 and/or 154, or a desired flow rate of liquid to be output from first nozzle 156 and/or second nozzle 166. A flow of liquid to be output from first nozzle 156 and second nozzle 166 is at least partially dependent on the operating speed of pump 120. As such, an instruction for an increase in the flow rate of liquid to be output from first nozzle 156 and/or second nozzle 166 is equivalent to a request to increase the operating speed of pump 120.

The PLC in base component 110 consults the predefined logic to determine 620 whether to execute the received instructions. As described above, the set of rules and logic define boundary conditions for the operation of system 100. Base component 110 then controls 630 operation of system 100 using the PLC based on the determination 620 of whether to execute the instructions received 610.

The above-described embodiments provide a cost-effective and reliable means of improving the control of a fire-fighting device. More specifically, the exemplary systems and method described herein overcome disadvantages of known fire-fighting control systems by enabling remote control of a fire-fighting device by a firefighter positioned a remote distance away from the device. As such, an additional user does not need to be positioned near the fire-fighting device to manually control the fire-fighting device. The remote control eliminates the need for wires or other communication cables extending along the hose lines and coupling the remote component to the base component. Such wires or other communication cables would likely be damaged during use of the fire-fighting device as the hose lines are often drug over rough surfaces that would damage the wires or cables. Moreover, the embodiments described herein also enable a user to be trained on operation of the fire-fighting device in a simulation environment. Accordingly, an ordinary computer is able to be used in conjunction with the remote component to train firefighters on operation of the fire-fighting device. As a result, the systems described herein facilitate increasing the efficiency of the fire-fighting control system in a cost-effective and reliable manner.

Exemplary embodiments of systems and methods for the remote control of a fire-fighting device are described above in detail. The methods and apparatus are not limited to the specific embodiments described herein, but rather, components of systems and/or steps of the method may be utilized independently and separately from other components and/or steps described herein. For example, the systems and methods may also be used in combination with other fire-fighting systems and methods, and are not limited to practice with only the fire-fighting device as described herein. Rather, the exemplary embodiment can be implemented and utilized in connection with many other fire-fighting devices.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for use with a fire-fighting device coupled to a pump, said system comprising:
    a remote component comprising a touch sensitive screen configured to receive a user-requested parameter of fluid, and to display a plurality of indicators associated with the fire-fighting device; and
    a base component in communication with said remote component, said base component comprising a programmable logic controller having predefined logic stored thereon, wherein said base component automatically controls operation of the pump based on the predefined logic and the user-requested parameter of fluid,
    wherein said remote component is configured to receive signals from said base component and, in response to signals received from said base component, present, via said touch sensitive screen, at least one of a first of the plurality of indicators indicative of a water volume associated with a first water source stored at the fire fighting device, and a second of the plurality of indicators indicative of a water pressure associated with a second water source remote from the fire-fighting device.

2. A control system in accordance with claim 1, wherein said remote component is further configured to present, via said touch sensitive screen, at least one of the plurality of indicators indicative of whether a nozzle is ready to discharge water in response to signals received from said base component.

3. A control system in accordance with claim 1, wherein said base component automatically further controls operation of the pump based on at least one of: a first actuation state of a first valve configured to control a first flow of liquid from a storage tank at the fire-fighting device, a second actuation state of a second valve configured to control a second flow of liquid from the remote water source, and a third actuation state of a third valve configured to control a third flow of liquid to a nozzle.

4. A control system in accordance with claim 3, wherein said remote component includes a plurality of input controls, wherein said base component further automatically controls operation of the first valve, the second valve, the third valve, and the pump based at least on the predefined logic and a user input received via the plurality of input controls.

5. A control system in accordance with claim 3, wherein the user-requested parameter of fluid represents a desired liquid pressure at the nozzle, and wherein said base component controls at least one of the pump, the first valve, the second valve, and the third valve based at least on the desired liquid pressure and the predefined logic.

6. A control system in accordance with claim 1, wherein said remote component comprises at least one ladder control that controls a position of a ladder associated with the fire-fighting device.

7. A control system in accordance with claim 1, wherein said remote component is in communication with a camera remote from the fire-fighting device, said remote component configured to display image data received from the camera to a user.

8. A control system for use with a fire-fighting device, said system comprising:
    a pump coupled to the fire-fighting device;
    a storage tank coupled to the fire-fighting device for storing a volume of water;
    a first valve controlling a first flow of liquid from said storage tank;
    a second valve controlling a second flow of liquid from a remote water source;
    a third valve controlling a third flow of liquid to a nozzle associated with the fire-fighting device;
    a remote component comprising a touch sensitive screen configured to receive a user-requested parameter of fluid, and to display a plurality of indicators associated with the fire-fighting device; and
    a base component in communication with said remote component, said base component coupled to the fire-fighting device and comprising a programmable logic controller having predefined logic stored thereon, wherein said base component automatically controls operation of said pump and at least one of said first valve, said second valve, and said third valve based on the predefined logic and the user-requested parameter of fluid,
    wherein said remote component is configured to receive signals from said base component and, in response to signals received from said base component, present, via said touch sensitive screen, at least one of a first of the plurality of indicators indicative of a water volume associated with a first water source stored at a fire fighting device, and a second of the plurality of indicators indicative of a water pressure associated with a second water source remote from the fire-fighting device.

9. A control system in accordance with claim 8, wherein said remote component is further configured to present, via said touch sensitive screen, at least one of the plurality of indicators indicative of whether the nozzle is ready to discharge water in response to signals received from said base component.

10. A control system in accordance with claim 8, wherein said base component automatically further controls operation of said pump based on at least one of: a first actuation state of said first valve, a second actuation state of said second valve, and a third actuation state of said third valve.

11. A control system in accordance with claim 8, wherein said remote component includes a plurality of input controls, wherein said base component automatically controls operation of said first valve, said second valve, said third valve, and said pump based at least on the predefined logic and a user input received via the plurality of input controls.

12. A method of controlling a fire-fighting device coupled to a pump, said method comprising:
   providing a remote component including a touch sensitive screen;
   providing a base component in communication with the remote component, the base component including a programmable logic controller having predefined logic stored thereon;
   receiving, at the touch sensitive screen, a user-requested parameter of fluid;
   automatically controlling, using the base component, operation of the pump based on the predefined logic and the user-requested parameter of fluid;
   receiving, at the remote component, signals from the base component; and
   in response to signals received from the base component, presenting, via the touch sensitive screen, at least one of a first of a plurality of indicators indicative of a water volume associated with a first water source stored at a fire fighting device, and a second of the plurality of indicators indicative of a water pressure associated with a second water source remote from the fire-fighting device.

13. A method in accordance with claim 12 wherein automatically controlling operation of the pump includes automatically controlling operation of the pump further based on at least one of: a first actuation state of a first valve configured to control a first flow of liquid from the first water source and a second actuation state of a second valve configured to control a second flow of liquid from the second water source.

14. A method in accordance with claim 12 further comprising determining, with the programmable logic controller, and based on the predefined logic, whether to execute instructions based on the user-requested parameter of fluid received from the remote component, wherein automatically controlling operation of the pump is further based on the determination of whether to execute the instructions.

15. A method in accordance with claim 14, further comprising transmitting a message to the remote component indicating the instructions are not executed based on the determination.

16. A method in accordance with claim 12 wherein the plurality of indicators further includes at least one of a first actuation state of a first valve configured to control a first flow of liquid from the first water source and a second actuation state of a second valve configured to control a second flow of liquid from the second water source, said method further comprising presenting, via the touch sensitive screen, at least one of the first actuations state and the second actuation state, based on signals received from the base component.

* * * * *